United States Patent [19]
Iima

[11] Patent Number: 5,442,477
[45] Date of Patent: Aug. 15, 1995

[54] OPTICAL SCANNING SYSTEM

[75] Inventor: Mitsunori Iima, Tokyo, Japan

[73] Assignee: Asahi Kogaku Kogyo Kabushiki Kaisha, Tokyo, Japan

[21] Appl. No.: 191,640

[22] Filed: Feb. 4, 1994

[30] Foreign Application Priority Data

Feb. 4, 1993 [JP] Japan .................. 5-017662

[51] Int. Cl.⁶ .................................. G02B 26/08
[52] U.S. Cl. ......................... 359/205; 359/217; 359/662
[58] Field of Search ............... 359/205, 662, 217, 728, 359/196

[56] References Cited

U.S. PATENT DOCUMENTS

| | | | |
|---|---|---|---|
| 4,756,583 | 7/1988 | Morimoto | 359/212 |
| 5,046,795 | 9/1991 | Morimoto et al. | 359/217 |
| 5,087,983 | 2/1992 | Takahashi | 359/205 |
| 5,095,383 | 3/1992 | Omura et al. | 359/196 |
| 5,134,511 | 7/1992 | Shiraishi | 359/217 |
| 5,179,465 | 1/1993 | Kondo | 359/218 |
| 5,200,850 | 4/1993 | Iizuka et al. | 359/206 |

Primary Examiner—Loha Ben
Assistant Examiner—Suma N. Ramaswamy
Attorney, Agent, or Firm—Sandler, Greenblum & Bernstein

[57] ABSTRACT

An optical scanning system is provided which includes a light source, a scanning deflector which deflects a bundle of rays emitted from the light source, and a scanning lens group which converges the deflected bundle of rays onto an image surface to form an image. The scanning lens group includes at least one glass lens and at least two plastic lenses, and the at least one glass lens provides substantially all the power of the scanning lens group.

9 Claims, 10 Drawing Sheets

OPTICAL SCANNING SYSTEM

BACKGROUND OF THE INVENTION

1. Field of the Invention

The present invention relates to an optical scanning system used for a laser printer or a similar optical device. More precisely, it relates to an optical scanner having a high resolution and a small f-number, in which little or no displacement of focal point occurs due to a change in temperature.

2. Description of Related Art

To reduce the manufacturing cost or weight of a scanning lens system in a laser printer, the lens, or lenses, is usually made of plastic. However, the linear expansion and refractive index of plastic is more significantly influenced by the change in temperature than that of glass, resulting in the displacement of the focal point. This results in a deteriorated quality of print.

To eliminate the adverse effect caused by the temperature variation, it is known to provide a plurality of plastic lenses in combination within the scanning lens system so that the displacement of the focal point caused by the temperature change is cancelled.

However, in the above-mentioned known solution in which temperature compensation is carried out by a plurality of plastic lenses in combination, the number of lenses in which the scanning lens system is comprised is increased. This prevents the realization of a compact optical scanner and the reduction of the manufacturing cost.

SUMMARY OF THE INVENTION

The primary object of the present invention is to provide an optical scanning system having a small f-number, in which the focal point thereof is little influenced by the change in temperature without increasing the number of lenses including a plastic lens or lenses of which the scanning lens system is comprised.

To achieve the object mentioned above, according to the present invention, an optical scanning system is provided which includes a light source, a scanning deflector which deflects a bundle of rays emitted from the light source, and a scanning lens group which converges the deflected bundle of rays onto an image surface to form an image. The scanning lens group includes at least one glass lens and at least two plastic lenses, and the, at least one glass lens provides substantially all the power of the scanning lens group.

Preferably, the following relationship exists in the optical scanning system;

$$0.8 < \overset{n}{\Sigma} (f/f_{nG}) < 1.3$$

wherein "$f_{nG}$" designates a focal length in the main scanning direction of n-th said glass lens from the deflector side in said scanning lens group, wherein "f" designates a focal length in the main scanning direction of the scanning lens group as a whole, and wherein "$\overset{n}{\Sigma} (1/f_{nG})$"

designates the resultant power in the main scanning direction of all the glass lenses in the scanning lens group, respectively.

In case that the scanning lens group includes a single glass lens, the following relationship exists:

$$0.8 < f/f_G < 1.3$$

wherein "f" designates the focal length in the main scanning direction of the single glass lens.

The present disclosure relates to subject matter contained in Japanese patent application No. 5-17662 (filed on Feb. 4, 1993) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Embodiments of a scanning optical system which can be applied, for example, to a laser printer will be discussed below.

Figure 1:
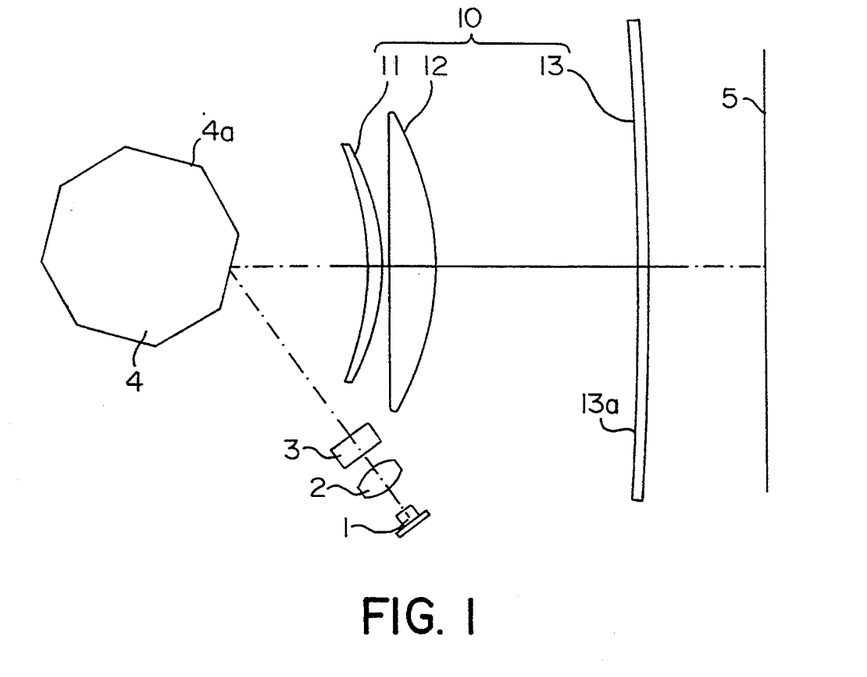
FIG. 1 is a conceptual view of a main scanning plane of an optical scanning system, according to the present invention.

With reference to FIG. 1, divergent light emitted from a light source, such as a semiconductor laser 1 is collimated by a collimating lens 2 and is converged in the sub scanning direction (i.e., direction perpendicular to the sheet of the drawing) by a cylindrical lens (i.e., anamorphic image forming lens) 3 to form a line image.

A polygonal mirror 4 (i.e., scanning deflector) has a reflecting surface 4a that is located in the vicinity of the line image to reflect and deflect the bundle of rays. The deflected bundle of rays is converged onto an image surface 5 by an fθ lens system 10 as a scanning lens system to form a spot image. The spot image is moved (i.e., scanned) on the image surface 5 in accordance with the rotation of the polygonal mirror 4.

The fθ lens system 10 is comprised of a first plastic lens 11, a second glass lens 12, and a third plastic lens 13. The lenses 11, 12 and 13 are arranged in this order from the polygonal mirror side. The first lens 11 is made of an aspheric lens. The third lens 13 is made of a meniscus lens with a convex lens surface facing the image surface 5. The surface 13a of the third lens 13 facing towards the polygonal mirror 4 is a toric surface whose radius of curvature in the sub scanning direction increases from the optical axis towards the periphery thereof. A lens having a small f-number can reduce the laser beam diameter on the image surface, but the focal depth falls accordingly. In view of this, the image surface is preferably a flat surface. The aspheric lens surface contributes to the enhancement of the flatness of the image surface.

The second lens 12 is a spherical lens, such as a; and plano-convex lens with a convex lens surface facing the image surface.

Consequently, the second glass lens 12 can be easily and inexpensively manufactured.

The resultant power of the fθ lens system 10 substantially relies entirely upon the second lens 12. Namely, the first lens 11 and the third lens 13 mainly function to correct the aberration of the optical system and improve the fθ characteristics.

Preferably, the fθ lens system 10 satisfies the following relationship;

$$0.8 < f/fG < 1.3 \qquad \text{(FORMULA 1)}$$

wherein "fG" designates the focal length of the glass lens (second lens) 12 in the main scanning direction, and, "f" designates the resultant focal length of the fθ lens system 10 as a whole.

As can be seen from the foregoing, since a large part of the power of the fθ lens system 10 relies upon the glass lens 12 which is little influenced by the change in temperature, according to the present invention, the optical characteristics of the fθ lens system 10 are little influenced by the change in temperature, in spite of the presence of the plastic lens or lenses.

Moreover, the fθ lens system 10 preferably satisfies the following relationship;

$$0.5 < |dG/R4| < 0.8 \qquad \text{(FORMULA 2)}$$

wherein "dG" designates the distance on the optical axis between the deflection point of light by the polygonal mirror 4 (i.e., intersecting point of the optical axis of the collimating lens 2 and the optical axis of the fθ lens system 10) and the convex lens surface of the glass lens 12 of the fθ lens system 10 that is located nearest to the image surface, and "R4" the radius of curvature of the convex lens surface of the glass lens 12.

In the conventional scanning lens system having a large f-number, the correction of coma is not considered particularly important. However, coma becomes serious as the f-number decreases.

To prevent the occurrence of coma, it is advisable or necessary for the fθ lens system 10 to have a constant refracting power regardless of the incident angle of the bundle of rays thereupon. To this end, the radius of curvature R4 of the convex lens surface of the glass lens 12, which determines the resultant refracting power of the fθ lens system 10 substantially by itself, and the distance dG satisfy the specific relationship as defined in formula (2) mentioned above. If the radius of curvature R4 and the distance dG do not satisfy the formula (2), it is difficult to effectively correct the aberration of the scanning lens system having a small f-number.

The following discussion will be addressed to examples of concrete structure of the fθ lens system 10 used in the scanning optical system discussed above.

Embodiment 1

Figure 2:
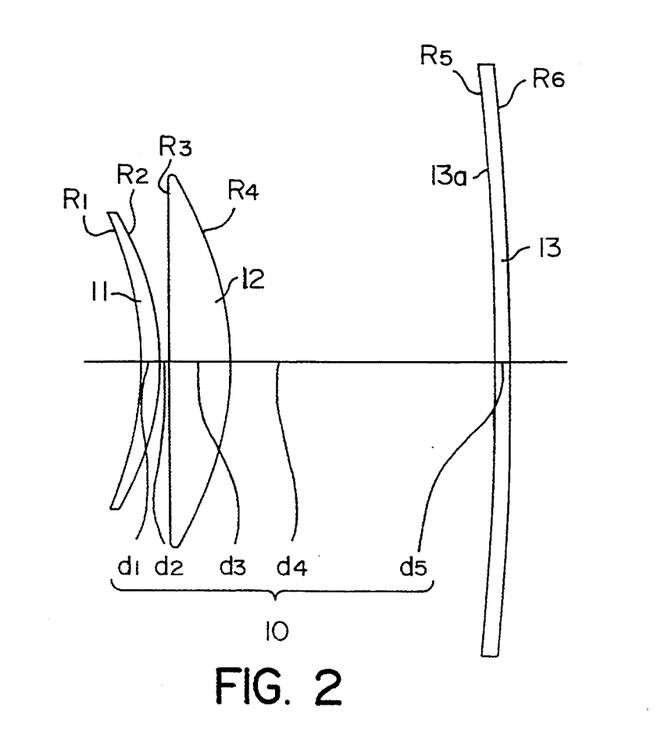
FIG. 2 is a conceptual view of an fθ lens system, according to a first embodiment of the present invention.

FIG. 2 shows a first example of the lens structure. Numerical data of the lens structure in the first embodiment is shown in Table 1 below. With reference to FIG. 1 and Table 1, "f" designates the focal length of the whole fθ lens system 10 in the main scanning direction; "f1" the focal length of the first lens in the main scanning direction; "f3" the focal length of the third lens in the main scanning direction; "fG" the focal length of the glass lens (second lens) 12 in the main scanning direction; "ω" the half angle of view; "dG" the distance from the polygonal mirror 4 to the lens surface of the glass lens 12 that is located nearest to the image surface; "d0" the distance from the polygonal mirror 4 to the first lens surface of the fθ lens system 10 (i.e., the first surface of the first lens 11); "Ry" the radius of curvature in the main scanning direction; "Rz0" the radius of curvature of the toric surface 13a on the optical axis in the sub scanning direction; "d" the lens thickness or the spatial distance (d6 is the distance from the terminal lens surface of the fθ lens system 10 (to the image surface 5); and, "n" the refractive index at 780 nm (wavelength).

TABLE 1

| f = 144.56 | f1 = 723.19, | fG = 178.85, | | |
|---|---|---|---|---|
| | f3 = −18001.92 | f/fG = 0.809 | | |
| ω = 42.68 | dG = 76.0 | dG/R4 = 0.67 | d0 = 45.0 | |
| lens surface No. | Ry | Rz0 | d | n |
| 1 | −125.40 | | 6.5 | 1.48617 |
| 2 | −94.00 | | 3.0 | |
| 3 | ∞ | | 21.5 | 1.63552 |
| 4 | −113.60 | | 89.9 | |
| 5 | −1100.00 | 20.9 | 5.0 | 1.48617 |
| 6 | −1260.00 | | 50.0 | |

Figure 3A:
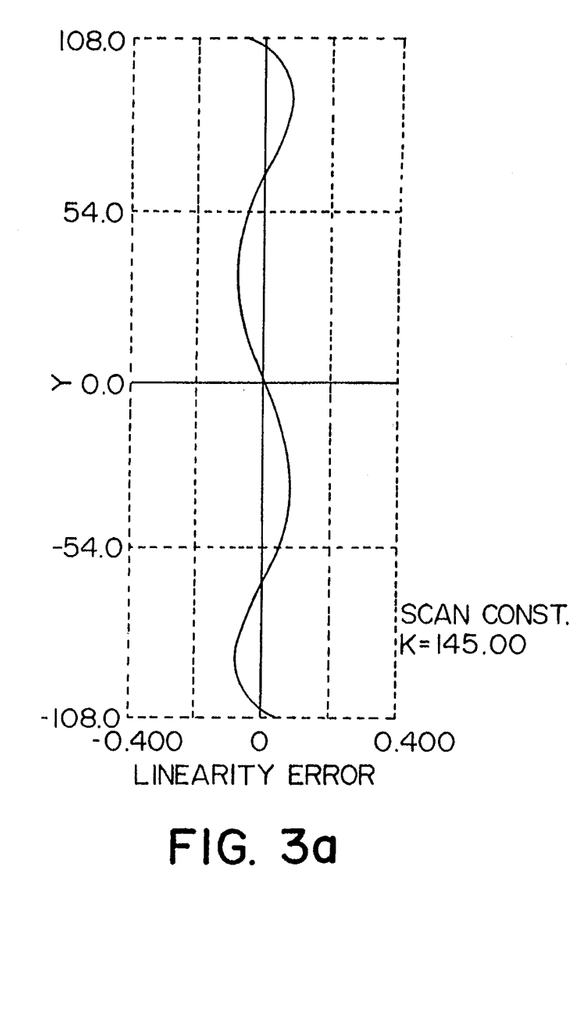
FIGS. 3a and 3b are diagrams of fθ characteristics and the curvature of the field of the fθ lens system shown in FIG. 2.
Figure 3B:
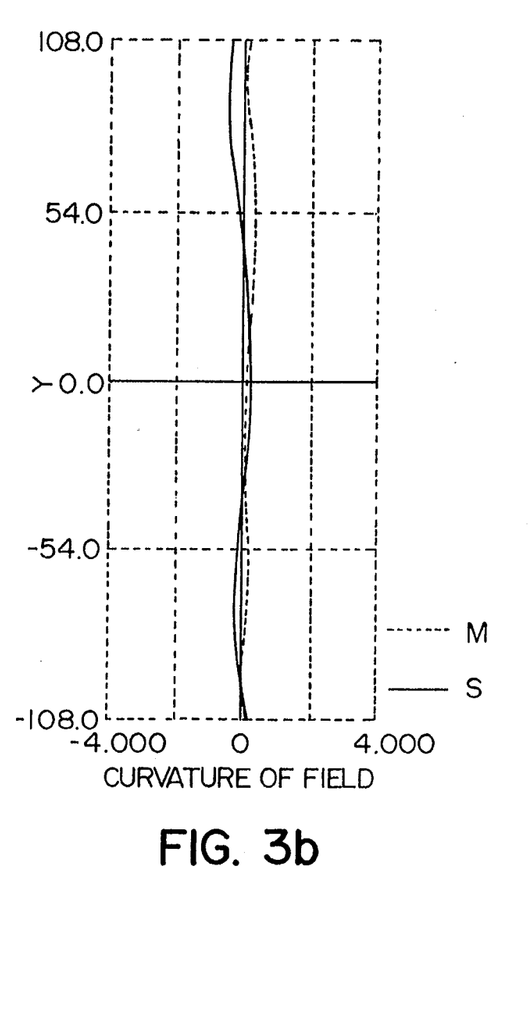

FIGS. 3a and 3b show the fθ characteristics (linearity error) and the curvature of field (out of focus error) of the fθ lens system of the first embodiment, respectively. In FIGS. 3a and 3b, "M" designates the meridional direction (i.e., main scanning direction); and "S" the sagittal direction (i.e., sub scanning direction), respectively. The ordinate represents the scanning position in the main scanning direction and the abscissa represents the deviation of the scanning position (FIG. 3a) and the focus deviation (FIG. 3b) in the sub scanning direction, respectively. In this embodiment, the first lens surface is an aspheric surface of rotation-symmetry. The aspheric surface is defined by the following equation;

$$X = \{CY^2/(1+(1-(1+K)C^2Y^2)^{\frac{1}{2}})\} + A4Y^4 + A6Y^6 + A8Y^8$$

wherein "X" designates the distance from the tangential plane at the aspheric apex in coordinates of the aspheric surface at which the height from the optical axis is Y; "C" the curvature (1/r) of the aspheric apex, "K" the constant of cone; and "A4", "A6" and "A8" the constants of the 4th, 6th, and 8th order aspheric surfaces, respectively. The values of "K", "A4", "A6" and "A8"

are shown in Table 2 below, by way of example. The fifth lens surface is a toric surface.

TABLE 2

| 1st lens surface; aspheric coefficients |
|---|
| K = 3.104 |
| A4 = 1.47 × 10$^{-7}$ |
| A6 = 2.70 × 10$^{-11}$ |
| A8 = 7.50 × 10$^{-15}$ |

Embodiment 2

Figure 4:
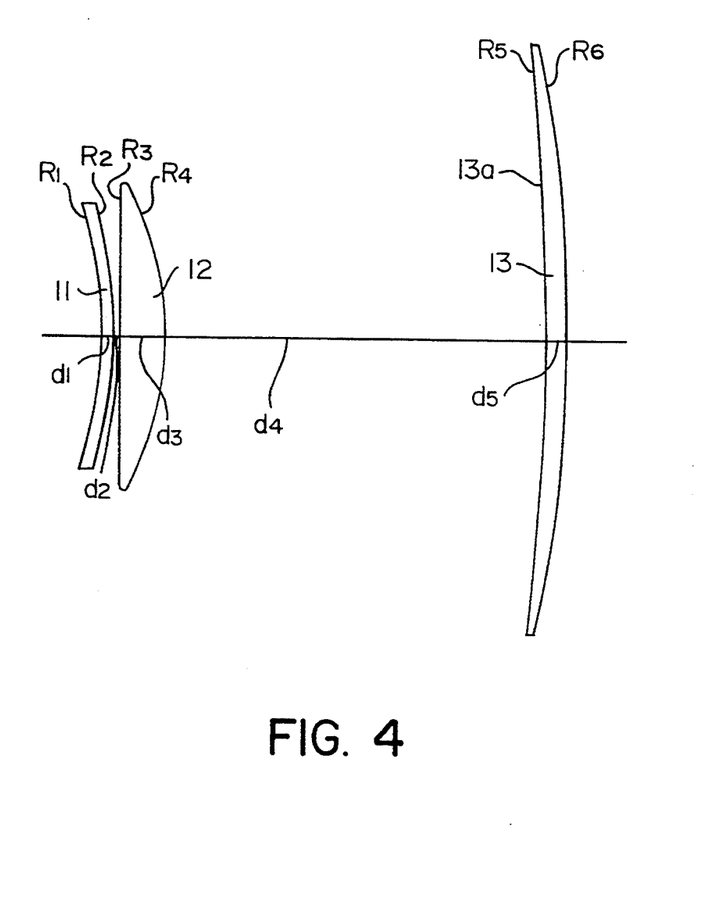
FIG. 4 is a conceptual view of an fθ lens system according to a second embodiment of the present invention.
Figure 5A:
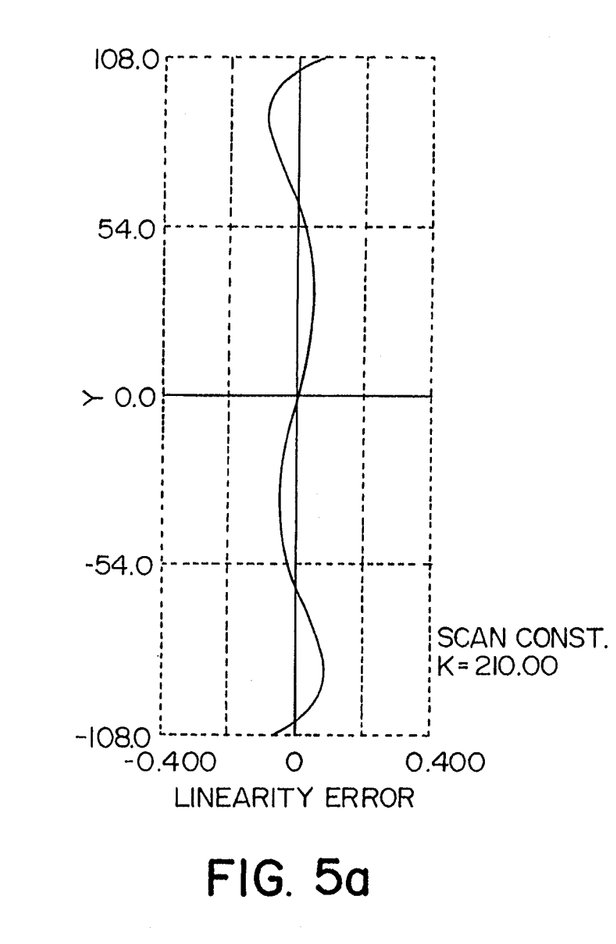
FIGS. 5a and 5b are diagrams of fθ characteristics and the curvature of the field of an fθ lens system shown in FIG. 4.
Figure 5B:
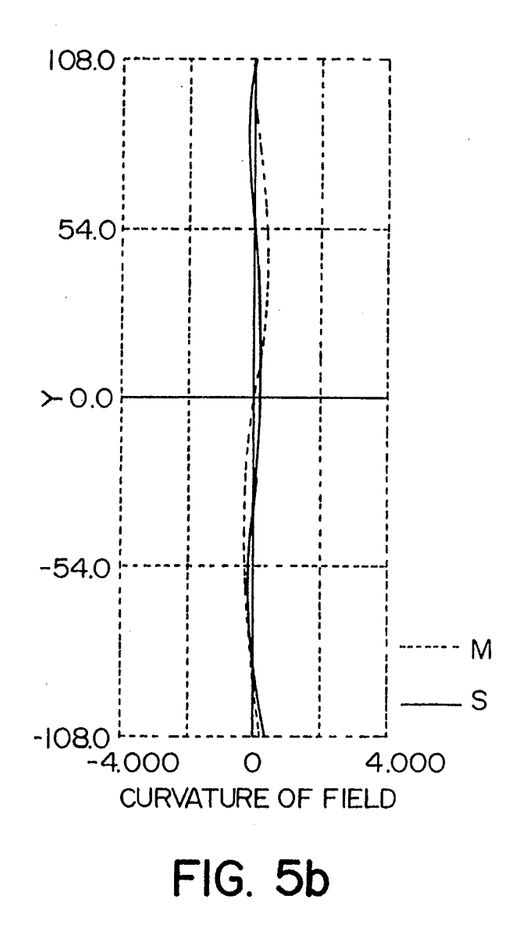

FIG. 4 shows a second example of the lens structure. Numerical data of the second embodiment is shown in Table 3 below. FIGS. 5a and 5b show the fθ characteristics (linearity error) and the curvature of field (out of focus error), of the fθ lens system 10 in the second embodiment, respectively. In the second embodiment, the first lens surface and the sixth lens surface are aspheric surfaces, and the constants of the aspheric surfaces are shown in Table 4 below. The fifth lens surface is a toric surface.

TABLE 3

| f = 210.48 | f1 = −6004.89, | fG = 207.16, | | |
|---|---|---|---|---|
| | f3 = 7203.65 | f/fG = 1.016 | | |
| ω = 29.47 | dG = 76.70 | dG/R4 = 0.73 | d0 = 55.00 | |
| lens surface No. | Ry | Rz0 | d | n |
| 1 | −153.50 | | 4.00 | 1.48617 |
| 2 | −163.40 | | 2.20 | |
| 3 | ∞ | | 15.50 | 1.51072 |
| 4 | −105.80 | | 130.80 | |
| 5 | −788.00 | 31.38 | 6.50 | 1.48617 |
| 6 | −645.00 | | 78.81 | |

TABLE 4

| 1st lens surface; aspheric coefficients |
|---|
| K = 3.546 |
| A4 = −8.376 × 10$^{-9}$ |
| A6 = 2.558 × 10$^{-11}$ |
| A8 = 3.550 × 10$^{-15}$ |
| 6th lens surface; aspheric coefficients |
| K = −2.110 |
| A4 = −3.497 × 10$^{-8}$ |
| A6 = 1.029 × 10$^{-12}$ |
| A8 = 5.225 × 10$^{-17}$ |

Embodiment 3

Figure 6:
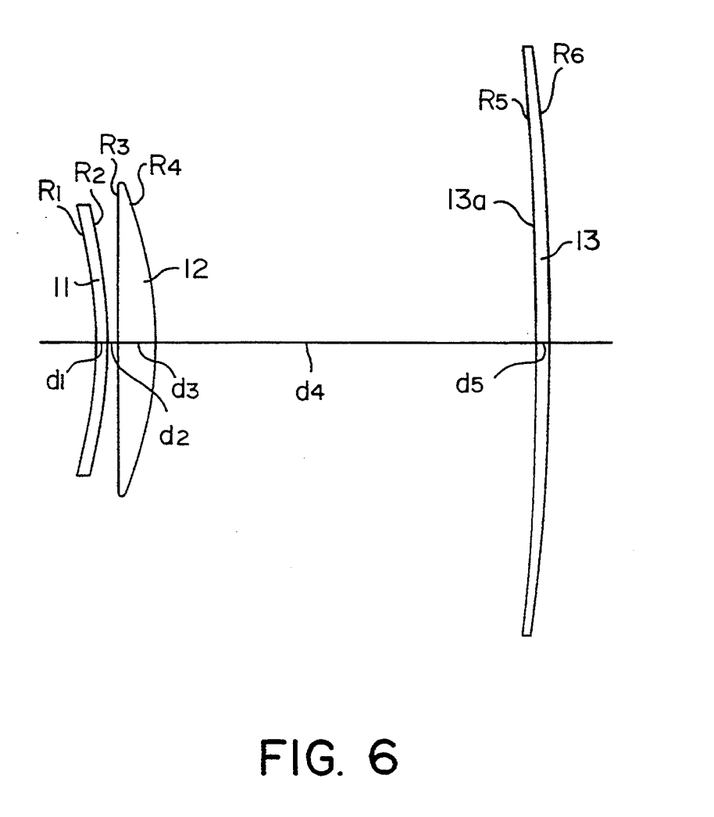
FIG. 6 is a conceptual view of an fθ lens system according to a third embodiment of the present invention.
Figure 7A:
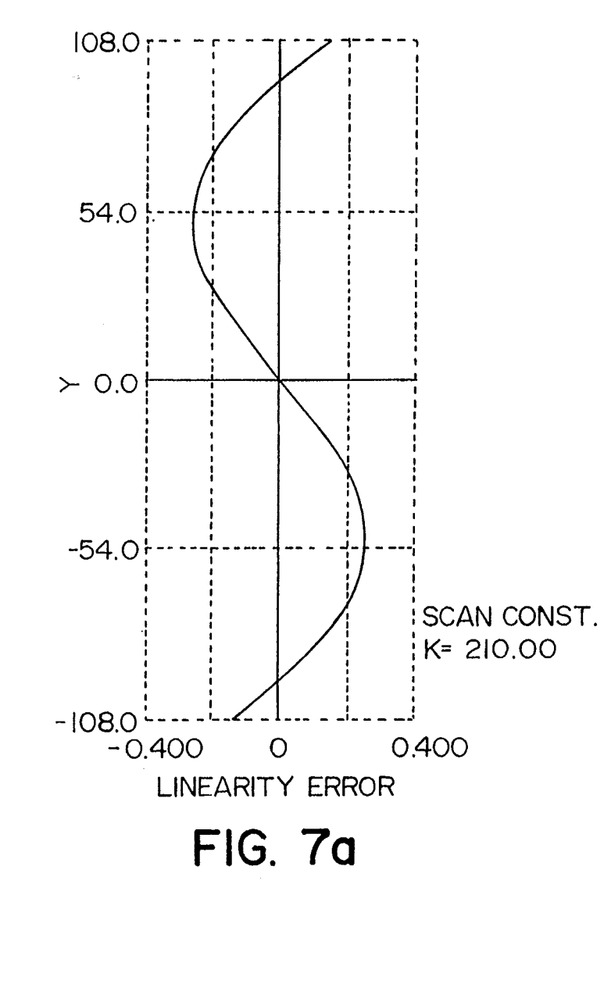
FIGS. 7a and 7b are diagrams of fθ characteristics and the curvature of field of the fθ lens system shown in FIG. 6.
Figure 7B:
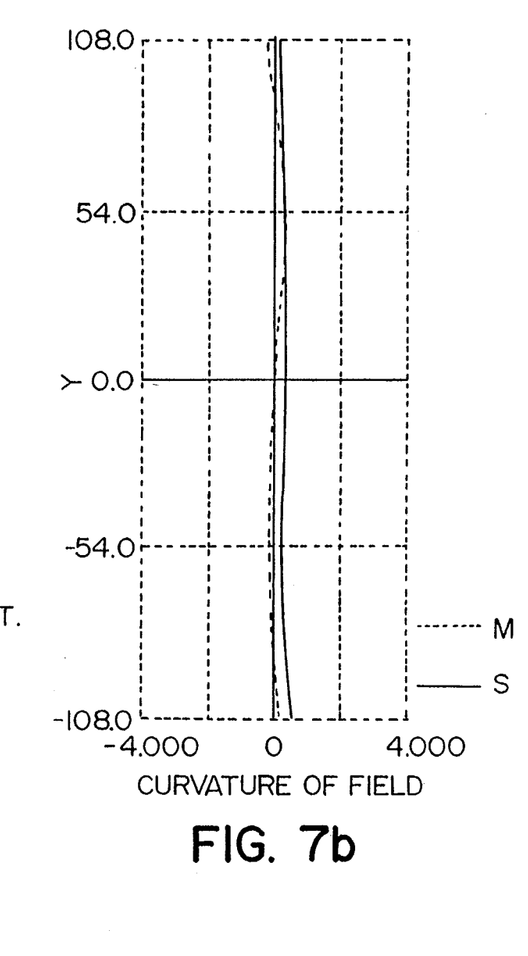

FIG. 6 shows a third example of the lens structure. Numerical data of the third embodiment is shown in Table 5 below. FIGS. 7a and 7b show the fθ characteristics (linearity error) and the curvature of field (out of focus error), of the fθ lens system 10 in the third embodiment, respectively. In this embodiment, the first surface is an aspheric surface, and the fifth surface is a toric surface. The constants of the aspheric surfaces are shown in Table 6 below.

TABLE 5

| f = 208.38 | f1 = −6109.75, | fG = 205.57, | | |
|---|---|---|---|---|
| | f3 = 6785.86 | f/fG = 1.014 | | |
| ω = 29.47 | dG = 85.50 | dG/R4 = 0.65 | d0 = 65.00 | |
| lens surface No. | Ry | Rz0 | d | n |
| 1 | −158.271 | | 4.00 | 1.48617 |
| 2 | −168.561 | | 3.50 | |
| 3 | ∞ | | 13.00 | 1.63552 |
| 4 | −130.643 | | 130.80 | |
| 5 | −1069.163 | 31.324 | 4.50 | 1.48617 |
| 6 | −808.588 | | 78.12 | |

TABLE 6

| 1st lens surface; aspheric coefficients |
|---|
| K = 3.0402 |
| A4 3.44268 × 10$^{-8}$ |
| = |
| A6 9.97628 × 10$^{-12}$ |
| = |
| A8 0 |
| = |

Embodiment 4

Figure 8:
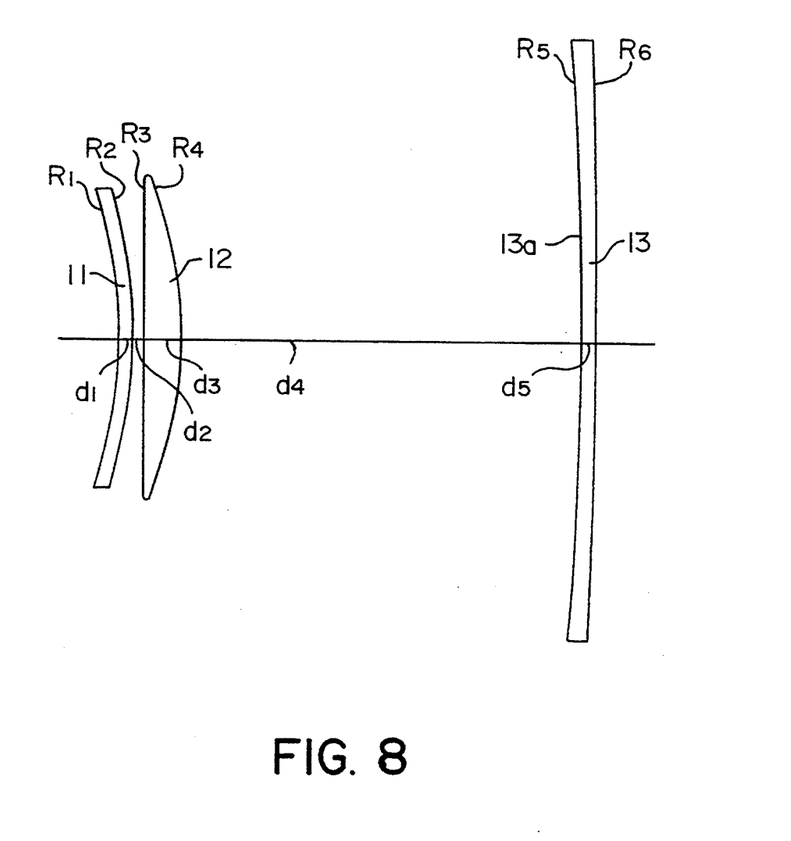
FIG. 8 is a conceptual view of an fθ lens system according to a fourth embodiment of the present invention.
Figure 9A:
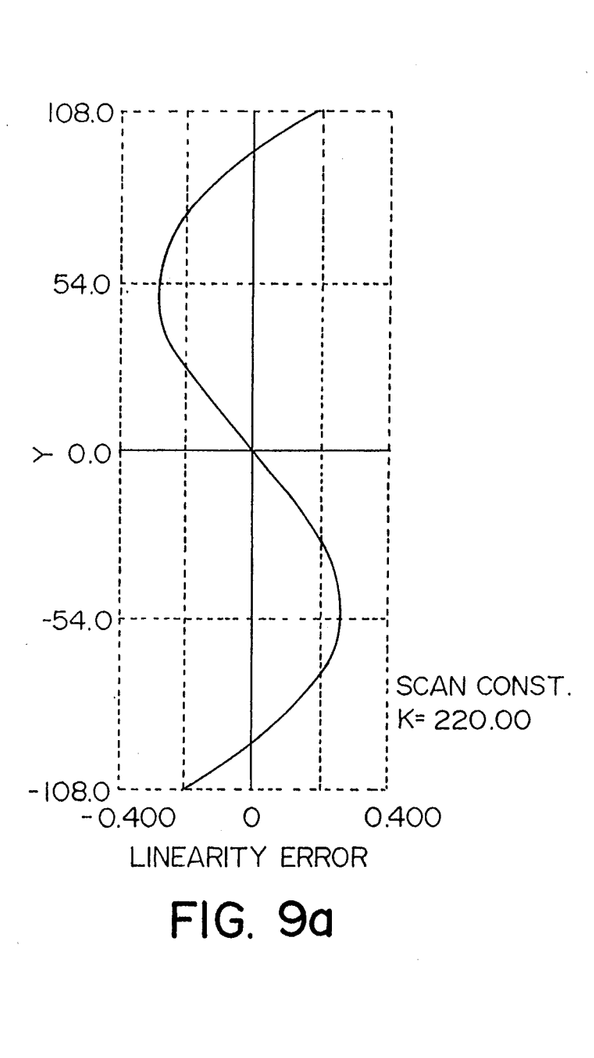
FIGS. 9a and 9b are diagrams of fθ characteristics and the curvature of the field of the fθ lens system shown in FIG. 8.
Figure 9B:
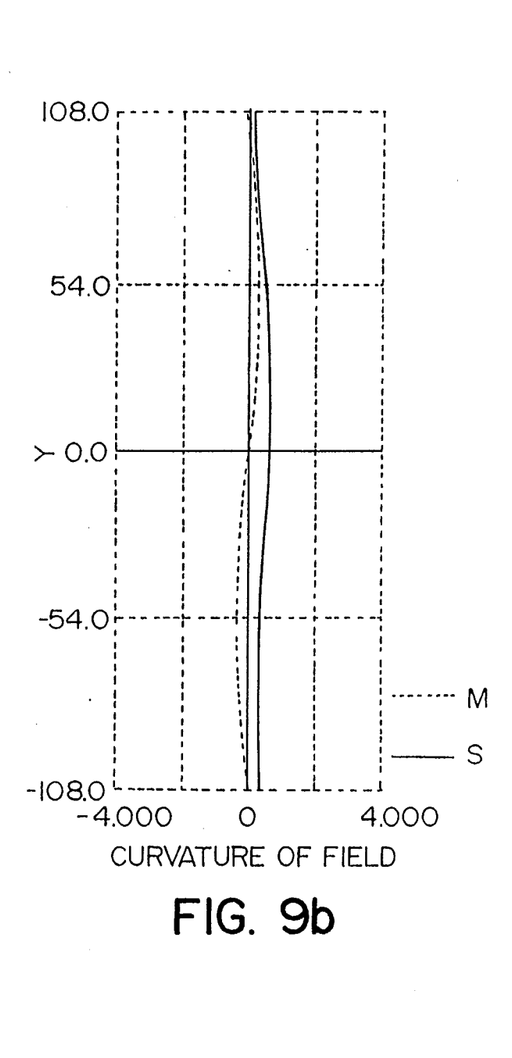

FIG. 8 shows a fourth example of the lens structure. Numerical data of the fourth embodiment is shown in Table 7 below. FIGS. 9a and 9b show the fθ (linearity error) and the curvature of field (out of focus error), of the fθ lens system 10 in the fourth embodiment, respectively. In the fourth embodiment, the first and second lens surfaces are aspheric surfaces, and the constants of the aspheric surfaces are shown in Table 8 below. The fifth lens surface is a toric surface.

TABLE 7

| f = 218.19 | f1 = 33220.85, | fG = 218.24, | | |
|---|---|---|---|---|
| | f3 = −5353.58 | f/fG = 1.000 | | |
| ω = 28.13 | dG = 87.00 | dG/R4 = 0.63 | d0 = 65.00 | |
| lens surface No. | Ry | Rz0 | d | n |
| 1 | −166.501 | | 5.00 | 1.48617 |
| 2 | −166.421 | | 4.00 | |
| 3 | ∞ | | 13.00 | 1.63552 |
| 4 | −138.695 | | 137.00 | |
| 5 | −1257.266 | 30.874 | 5.00 | 1.48617 |
| 6 | −2435.268 | | 77.78 | |

TABLE 8

| 1st lens surface; aspheric coefficients |
|---|
| K = 3.7717 |
| A4 = 5.22427 × 10$^{-8}$ |
| A6 = 1.04766 × 10$^{-11}$ |
| A8 = 8.74634 × 10$^{-16}$ |
| 2nd lens surface; aspheric coefficients |
| K = −0.0628 |
| A4 = 1.95905 × 10$^{-9}$ |
| A6 = 3.17456 × 10$^{-13}$ |
| A8 = 0 |

Embodiment 5

Figure 10:
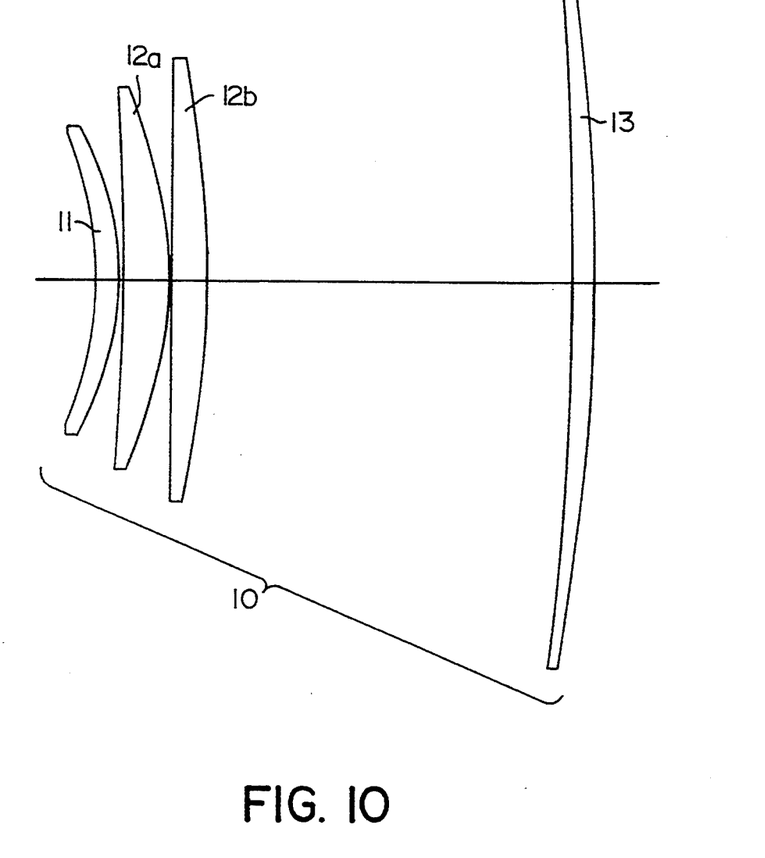
FIG. 10 is a conceptual view of an fθ lens system according to a fifth embodiment of the present invention; and, FIGS. 11a and 11b are diagrams of fθ characteristics and the curvature of the field of the fθ lens system shown in FIG. 10.
Figure 11A:
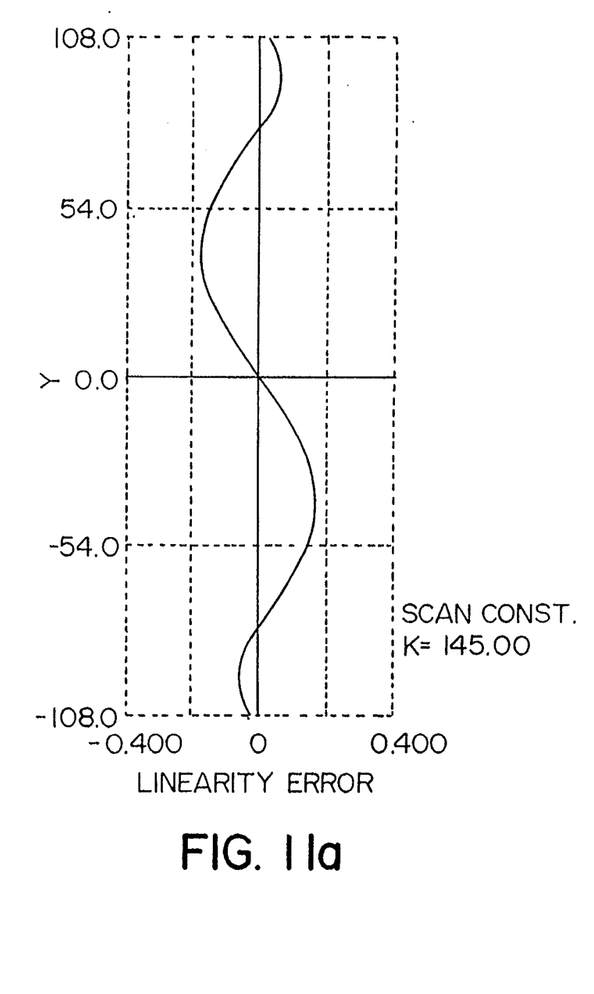
Figure 11B:
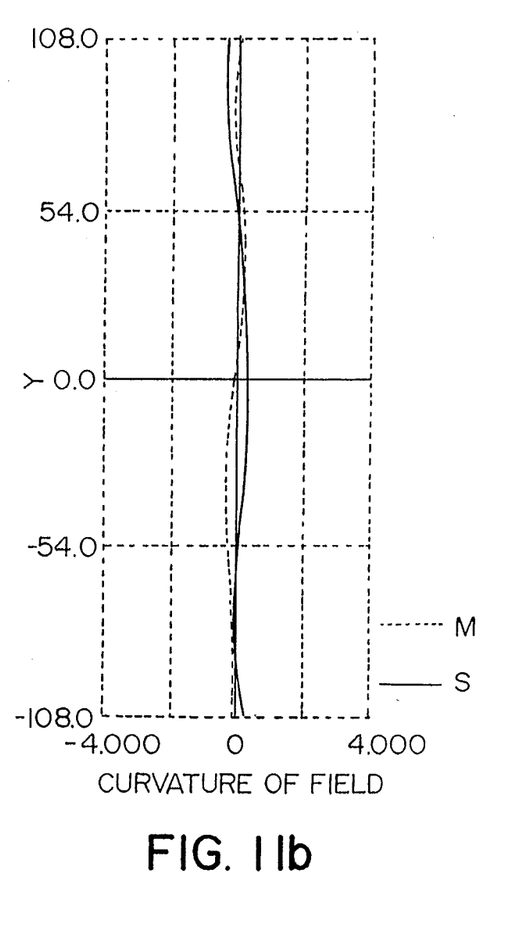

FIG. 10 shows a fifth example of the lens structure. Numerical data of the fifth embodiment is shown in Tables 9 and 10 below. In Table 9, "f$_{2G}$" designates the focal length of the second glass lens in the main scanning direction, and "f$_{3G}$" designates the focal length of the third glass lens in the main scanning direction. FIGS. 11a and 11b show the fθ characteristics (linearity error) and the curvature of field (out of focus error), of the fθ lens system 10 in the fifth embodiment, respectively.

In the fifth embodiment, the scanning lens group is comprised of a first plastic lens 11, a second glass lens 12a, a third glass lens 12b, and a fourth plastic lens 13, located in this order from the deflector side. The first surface of the first plastic lens 11 is an aspheric surface, and the seventh surface of the fourth plastic lens is a toric surface, respectively.

Table 9

TABLE 9

$f = 143.98 \quad f_{2G} = 275.81, \quad f_{3G} = 486.89,$
$(f/f_{2G}) + (f/f_{3G}) = 0.82$
$\omega = 42.68 \quad d0 = 37.00$

| lens surface No. | Ry | Rz0 | d | n |
| --- | --- | --- | --- | --- |
| 1 | −91.134 | | 5.5 | 1.48617 |
| 2 | −76.189 | | 1.0 | |
| 3 | −630.611 | | 11.0 | 1.49294 |
| 4 | −112.488 | | 0.7 | |
| 5 | ∞ | | 8.5 | 1.49294 |
| 6 | −240.006 | | 89.9 | |
| 7 | −802.382 | 20.56 | 5.0 | 1.48617 |
| 8 | −529.467 | | 49.93 | |

TABLE 10

| 1st surface; aspheric coefficients |
| --- |
| K = 1.2873 |
| A4 = 2.11597 × 10⁻⁷ |
| A6 = 8.78363 × 10⁻¹¹ |
| A8 = 1.30695 × 10⁻¹⁴ |

As can be understood from the above discussion, according to the present invention, since the refracting power of the whole scanning lens system mainly relies upon the glass lens or lenses, and the aberration is effectively corrected by the plastic lenses, a simple scanning optical system, which includes an inexpensive plastic lens, or lenses, that is little influenced by the change of the temperature can be provided.

I claim:

1. An optical scanning system comprising:
   a light source;
   a scanning deflector which deflects a bundle of rays emitted from said light source; and
   a scanning lens group which converges said deflected bundle of rays onto an image surface to form an image,
   wherein said scanning lens group comprises at least one glass lens and at least two plastic lenses,
   wherein said at least one glass lens provides substantially all the power of said scanning lens group, and wherein the following relationship is satisfied:

$$0.8 < \overset{n}{\Sigma} (f/f_{nG}) < 1.3$$

wherein "$f_{nG}$" designates a focal length in a main scanning direction of an n-th glass lens from the deflector side in said scanning lens group, wherein "f" designates a focal length in the main scanning direction of said scanning lens group as a whole, and wherein "$\overset{n}{\Sigma} (1/f_{nG})$"

designates the resultant power in the main scanning direction of n glass lenses in said scanning lens group, respectively.

2. The optical scanning system of claim 1, wherein said scanning lens group comprises a first plastic lens, a second glass lens, and a third plastic lens, located in this order from the deflector side.

3. The optical scanning system of claim 2, wherein said first lens is an aspheric lens.

4. The optical scanning system of claim 1, wherein said scanning lens group comprises a first plastic lens, a second glass lens, a third glass lens, and a fourth plastic lens, located in this order from the deflector side.

5. The optical scanning system of claim 4, wherein said first lens is an aspheric lens.

6. The optical scanning system of claim 1,
   wherein said scanning lens group comprises a single glass lens and said at least two plastic lenses.

7. The optical scanning system of claim 6, wherein said single glass lens is provided with a convex lens surface nearest to the image surface.

8. The optical scanning system of claim 7, wherein the following relationship exists;

$$0.5 < |dG/R4| < 0.8$$

wherein "dG" designates the distance on the optical axis between the point at which light is deflected by the deflector and the convex surface of said single glass lens that is located nearest to the image surface, and wherein "R4" is the radius of curvature of the convex lens surface of said single glass lens.

9. An optical scanning system comprising:
   a light source;
   a scanning deflector which deflects a bundle of rays emitted from said light source;
   a scanning lens group which converges the deflected bundle of rays onto an image surface to form an image,
   wherein said scanning lens group comprises at least three lenses, at least one lens of said three lenses being a spherical glass lens, at least one lens of said three lenses being a plastic lens, and wherein said at least one spherical glass lens provides substantially all the power of the scanning lens group, and wherein the following relationship is satisfied:

$$0.8 < \overset{n}{\Sigma} (f/f_{ng}) < 1.3$$

wherein "$f_{ng}$" designates a focal length in a main scanning direction of an n-th glass lens from the deflector side in the scanning lens group, wherein "f" designates a focal length in the main scanning direction of the scanning lens group as a whole, and wherein "$\overset{n}{\Sigma} (1/f_{ng})$"

designates the resultant power in the main scanning direction of n glass lenses in the scanning lens group, respectively.

* * * * *

UNITED STATES PATENT AND TRADEMARK OFFICE
CERTIFICATE OF CORRECTION

PATENT NO. : 5,442,477
DATED : August 15, 1995
INVENTOR(S) : Mitsunori IIMA

It is certified that error appears in the above-indentified patent and that said Letters Patent is hereby corrected as shown below:

At column 8, line 33 (claim 9, line 4), after "source;" insert ---and,---.

Signed and Sealed this

Seventeenth Day of September, 1996

Attest:

BRUCE LEHMAN

Attesting Officer

Commissioner of Patents and Trademarks